United States Patent [19]

LaVene et al.

[11] Patent Number: 4,842,309

[45] Date of Patent: Jun. 27, 1989

[54] QUICK-CONNECT FLUID FITTING ASSEMBLY

[75] Inventors: Leon F. LaVene, Durand; Peter Palajac, Jr., Farmington Hills, both of Mich.

[73] Assignee: Schmelzer Corporation, Flint, Mich.

[21] Appl. No.: 51,835

[22] Filed: May 20, 1987

[51] Int. Cl.$^4$ ............................................. F16L 37/12
[52] U.S. Cl. .................................. 285/319; 285/340; 285/353; 285/362; 285/921; 285/924
[58] Field of Search ............... 285/319, 340, 323, 353, 285/362, 921, 924

[56] References Cited

U.S. PATENT DOCUMENTS

| | | |
|---|---|---|
| 921,691 | 5/1909 | Friday . |
| 1,542,421 | 6/1925 | Strongson . |
| 2,069,377 | 2/1937 | Matthiessen . |
| 2,111,956 | 3/1938 | Baldwin . |
| 2,123,889 | 7/1938 | Gleason . |
| 2,407,076 | 9/1946 | Harkness . |
| 2,441,344 | 5/1948 | Bosworth . |
| 2,465,197 | 3/1949 | Chatham . |
| 2,479,960 | 8/1949 | Osborn . |
| 2,599,767 | 6/1952 | Long . |
| 2,631,049 | 3/1953 | McGillis et al. ................ 285/924 X |
| 3,092,404 | 6/1963 | MacWilliam ..................... 285/334.4 |
| 3,248,135 | 4/1966 | Meripol ................................ 285/323 |
| 3,314,696 | 4/1967 | Ferguson et al. .................... 285/174 |
| 3,447,819 | 6/1969 | Borsum et al. ....................... 285/111 |

(List continued on next page.)

FOREIGN PATENT DOCUMENTS

| | | |
|---|---|---|
| 112631 | 12/1968 | Denmark . |
| 0034312 | 8/1981 | European Pat. Off. . |
| 0113206 | 7/1984 | European Pat. Off. . |
| 0135028 | 3/1985 | European Pat. Off. . |
| 163947 | 9/1949 | Fed. Rep. of Germany . |
| 2360921 | 6/1974 | Fed. Rep. of Germany . |
| 2307154 | 8/1974 | Fed. Rep. of Germany . |
| 2611233 | 9/1977 | Fed. Rep. of Germany . |
| 2622269 | 11/1977 | Fed. Rep. of Germany . |
| 46-16478 | 5/1971 | Japan . |
| 718350 | 11/1954 | United Kingdom . |
| 1024537 | 3/1966 | United Kingdom . |
| 1029123 | 5/1966 | United Kingdom ................ 285/340 |
| 1030535 | 5/1966 | United Kingdom . |
| 1122737 | 8/1968 | United Kingdom . |
| 1132383 | 10/1968 | United Kingdom . |
| 1145667 | 3/1969 | United Kingdom . |
| 1247598 | 9/1971 | United Kingdom . |
| 1294847 | 11/1972 | United Kingdom . |
| 1304644 | 1/1973 | United Kingdom . |
| 1343903 | 1/1974 | United Kingdom . |
| 1372262 | 10/1974 | United Kingdom . |
| 1533785 | 11/1978 | United Kingdom . |
| 2011001 | 7/1979 | United Kingdom . |
| 1578999 | 11/1980 | United Kingdom . |

OTHER PUBLICATIONS

Snap-Tite Catalog, Union City, Pennsylvania-7/1968, "Quick Disconnect Couplings".

*Primary Examiner*—Thomas F. Callaghan
*Attorney, Agent, or Firm*—Harness, Dickey, Pierce

[57] ABSTRACT

A quick-connect fitting assembly is disclosed for releasably connecting a pair of fluid conduits in fluid communication with one another. A socket portion on one of the fluid conduits is adapted for receiving the other fluid conduit inserted longitudinally into the socket portion. A laterally-extending protuberance on the inserted fluid conduit is longitudinally restrained by a retaining assembly generally adjacent the fluid socket, with the retaining assembly including one or more resilient spring of barb members longitudinally interlocked with the inserted fluid conduit. A pair of collar members are longitudinally interconnectable with one another, either by a threaded engagement or by a "bayonet-type" engagement, to releasably restrain the assembly in a connected condition. Such collar members can be provided with a feature by which complete disconnection of the fluid conduits is substantially prevented until any internal fluid pressure is relieved, at which time the fluid conduits can be completely separated.

34 Claims, 4 Drawing Sheets

U.S. PATENT DOCUMENTS

| | | | |
|---|---|---|---|
| 3,450,424 | 6/1969 | Calisher | 285/305 |
| 3,453,005 | 7/1969 | Foults . | |
| 3,512,119 | 5/1970 | Cameron | 285/362 X |
| 3,527,485 | 9/1970 | Goward et al. | 285/319 |
| 3,534,988 | 10/1970 | Lindsey | 285/305 |
| 3,537,730 | 11/1970 | Kresin | 285/362 X |
| 3,538,940 | 11/1970 | Graham . | |
| 3,569,903 | 3/1971 | Brishka | 285/319 X |
| 3,574,359 | 4/1971 | Klein | 285/305 X |
| 3,584,902 | 6/1971 | Vyse | 285/305 |
| 3,628,768 | 12/1971 | Hutt | 285/305 X |
| 3,672,708 | 6/1972 | Zemberry | 285/315 |
| 3,711,125 | 1/1973 | Dehar | 285/319 X |
| 3,718,350 | 2/1973 | Klein | 285/321 |
| 3,724,882 | 4/1973 | Dehar | 285/243 |
| 3,826,523 | 7/1974 | Eschbaugh | 285/319 X |
| 3,847,421 | 11/1974 | Eschbaugh et al. | 285/924 X |
| 3,929,356 | 12/1975 | DeVincent et al. | 285/305 |
| 3,929,357 | 12/1975 | DeVincent et al. | 285/319 |
| 3,933,378 | 1/1976 | Sandford et al. | 285/319 |
| 3,980,324 | 9/1976 | Bouteille et al. | 285/179 |
| 4,005,883 | 2/1977 | Guest | 285/322 |
| 4,009,896 | 3/1977 | Brewer | 285/305 |
| 4,035,005 | 7/1977 | De Vincent et al. | 285/319 |
| 4,080,752 | 3/1978 | Burge | 285/321 X |
| 4,111,464 | 9/1978 | Asano et al. | 285/321 X |
| 4,123,089 | 10/1978 | Viero et al. | 285/39 |
| 4,123,091 | 10/1978 | Cosentino et al. | 285/39 |
| 4,128,264 | 12/1978 | Oldford | 285/319 X |
| 4,135,745 | 1/1979 | Dehar | 285/319 |
| 4,214,586 | 7/1980 | Mericle | 285/370 X |
| 4,219,222 | 8/1980 | Brusadin | 285/319 X |
| 4,244,608 | 1/1981 | Stuemky | 285/305 |
| 4,266,814 | 5/1981 | Gallagher | 285/319 |
| 4,288,113 | 9/1981 | Saulnier | 285/340 X |
| 4,423,892 | 1/1984 | Bartholomew | 285/319 |
| 4,575,134 | 3/1986 | Sugano | 285/353 |
| 4,637,640 | 1/1987 | Fournier et al. | 285/319 |
| 4,681,351 | 7/1987 | Bartholomew | 285/319 |
| 4,753,458 | 6/1988 | Case et al. | 285/319 X |

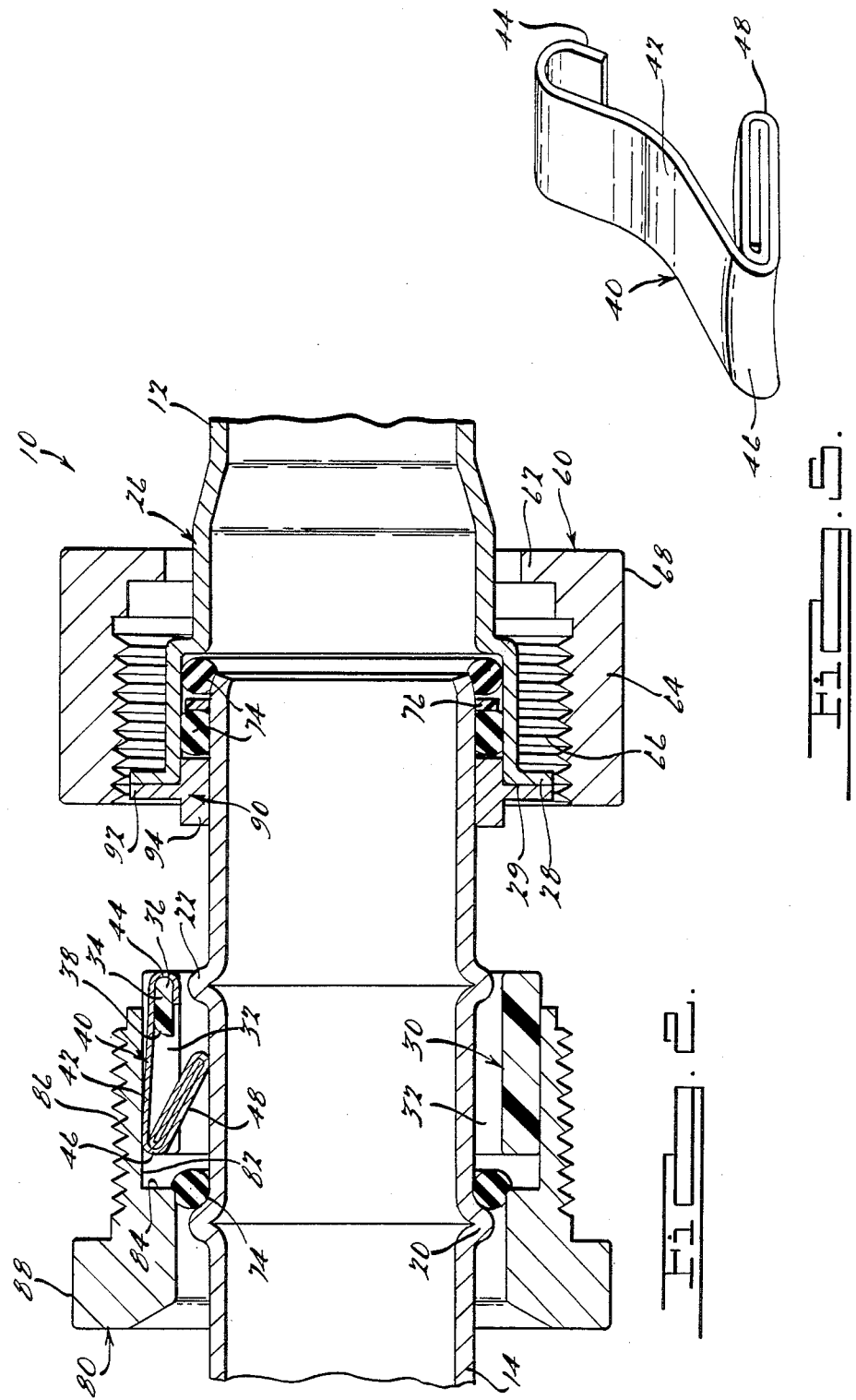

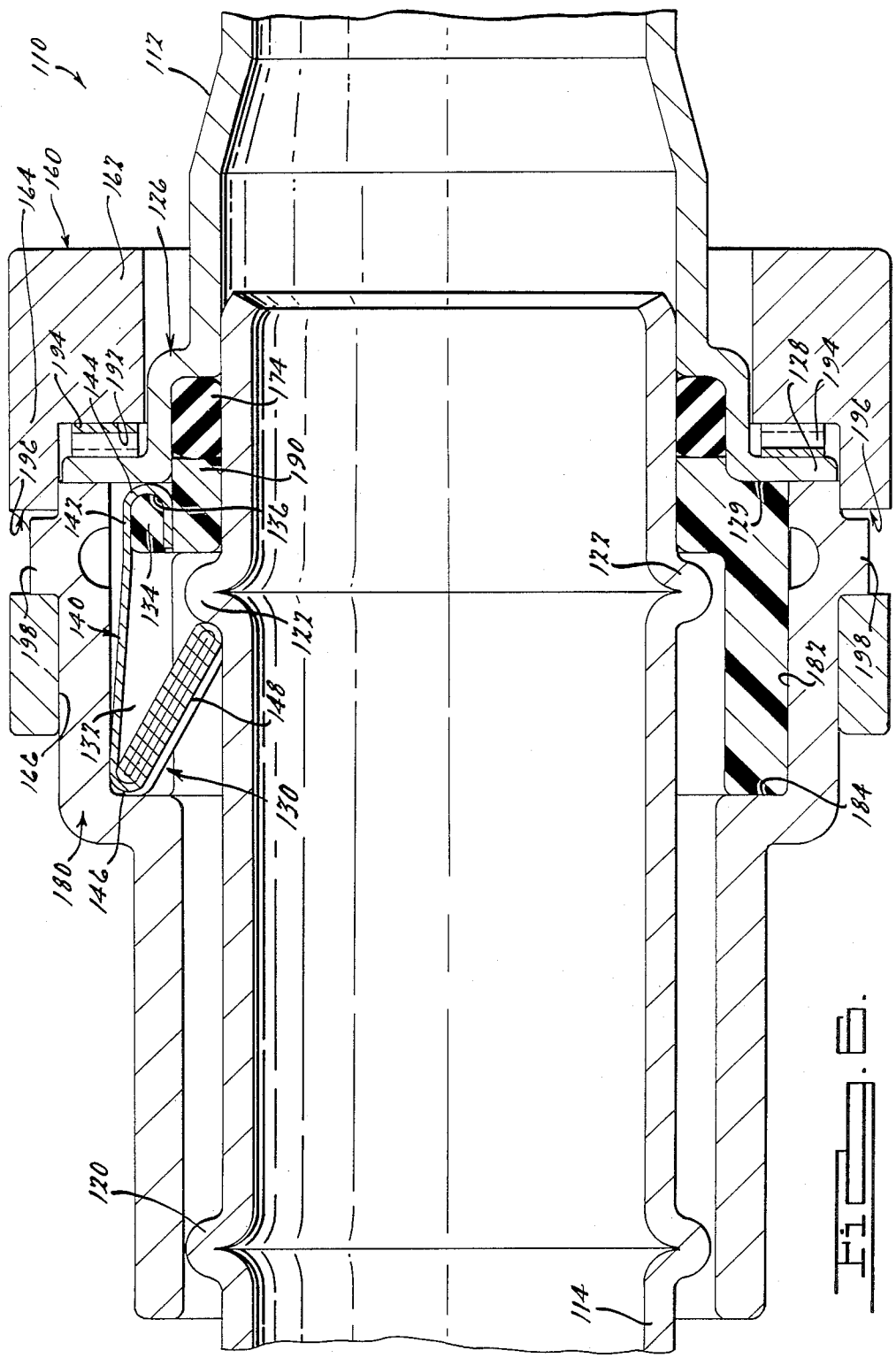

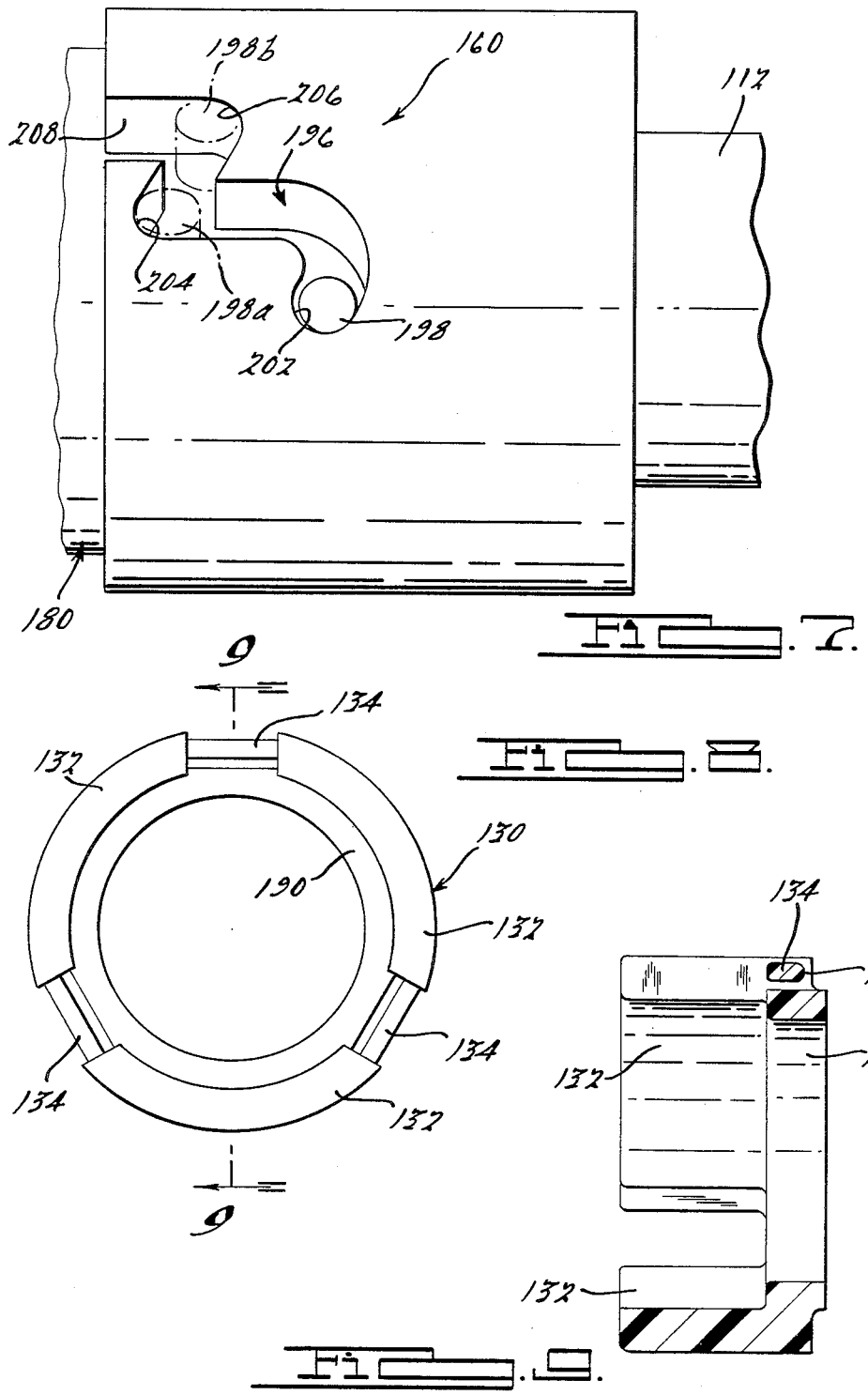

QUICK-CONNECT FLUID FITTING ASSEMBLY

BACKGROUND AND SUMMARY OF THE INVENTION

The invention relates generally to fluid conduit fittings or coupling devices. More particularly, the invention relates to fluid conduit fittings or couplings adapted for quickly and conveniently connecting or disconnecting a pair of fluid conduits.

A wide variety of fluid conduit fittings and couplings have been provided in the prior art for connecting fluid conduits in fluid communication with one another. One type of such previously-known couplings includes an external, generally U-shaped staple or spring clip inserted into lateral openings in an assembled fitting or coupling for purposes of interlocking the components of the assembly to one another. Frequently, however, such staples or clips become misplaced, or become permanently damaged or deformed due to repeated assembly and disassembly of the coupling, and thus must be replaced. In addition, such staples or clips frequently protrude outwardly from the fitting or coupling to an extent where they can easily snag on, or interfere with, other adjacent components or devices. Additionally, especially in high pressure applications, such staples or clips frequently must be quite stiff and relatively bulky this making them difficult or cumbersome to install or remove from a fluid coupling or fitting.

Other prior art fittings or couplings require external clamps or rings for compressing a flexible fluid conduit onto a nipple-like structure. Such compression fittings are frequently very time-consuming to install or remove during connection or disconnection of the fluid conduit. Like the staples and clips described above, external clamps or rings often become misplaced or permanently deformed or damaged during assembly and disassembly of the fluid conduit fitting and therefore must frequently be replaced.

Still other well-known fitting or coupling assemblies include male and female coupling elements that are threadably connectable to one another. Such threaded couplings, which typically rely upon the threaded engagement of the coupling elements both for mechanical interconnection and for fluid sealing, are frequently susceptible to leakage, thereby requiring application of sealing compounds or tape-like sealants to the threads each time the coupling elements are connected to one another. In addition, these fitting or coupling assemblies, like those discussed above, typically do not provide for fluid pressure relief prior to complete disconnection of the fluid conduits.

Accordingly, it is one of the objects of the present invention to provide an improved fitting or coupling assembly especially adapted for quickly, conveniently, and releasably connecting a pair of fluid conduits.

Another object of the present invention is to provide a fitting or coupling assembly that can be conveniently and easily disconnected in order to separate the fluid conduits from one another.

A further object of the present invention is to provide a fluid conduit fitting or coupling assembly that is relatively simple and inexpensive to manufacture and use, that is durable and reliable, and that provides a strong interlocking connection between the fluid conduits being joined together.

Still another object of the present invention is to provide a feature in an improved fitting or coupling assembly that substantially prevents complete disconnection of the fluid conduits until any internal fluid pressure (positive or negative) is relieved to a predetermined level (generally atmospheric pressure).

According to the general invention, a quick-connect fitting assembly for releasably connecting a pair of fluid conduits in fluid communication with one another includes a socket on one of the fluid conduits for receiving the other fluid conduit inserted longitudinally inwardly into the socket. The inserted fluid conduit has a generally laterally-extending protuberance thereon, and a retaining assembly within, or adjacent to, the fluid socket includes at least one resilient spring or barb member that is longitudinally and interlockingly engageable with the protuberance on the inserted fluid conduit. Preferably, a number of such barb members each include an anchoring portion that is longitudinally restrained by a retaining member, and a barb portion that is resiliently deflectable during insertion of the inserted fluid conduit. Once the spring or barb member is interlocked with the inserted fluid conduit, the resilient barb portion resists removal of the inserted fluid conduit until the retaining apparatus is disassembled.

The spring or barb members are preferably anchored and restrained by a retaining ring, and a pair of longitudinally interconnectable collar members serve to longitudinally interconnect and restrain the retaining ring and barb members within the fitting assembly. In one of the preferred embodiments, a first of the collar members is longitudinally engageable with an outwardly-protruding flange on the socket, and is threadably interconnectable with a second collar member on the inserted fluid conduit. In such an arrangement the second collar member includes an internal shoulder and recessed portion for receiving and longitudinally restraining at least the retaining ring and preferably the anchoring portions of the barb members. The preferred retaining ring of this embodiment includes a number of generally arcuate retaining ring segments or sections interconnected by retaining ring pins, to which generally hook-shaped ends of the anchoring portions of the barb members are connected.

The above-discussed embodiments of a quick-connect fitting assembly according to the present invention can also include a feature for relieving the internal fluid pressure of a charge fluid conduit during the initial stages of disconnection of the fluid conduits. In one such arrangement, the length, thread type, and thread helix of the various fitting components can be chosen such that pressure relief brings to occur after a preselected number of unthreading turns of these components relative to one another. An additional number of turns are required to completely disconnect the fluid conduits, thereby allowing for complete pressure relief prior to complete disconnection.

In another of the preferred embodiments of the present invention, the threaded collar members discussed above are replaced by relatively rotatable collar members having an interlocking, "bayonet-type" mutual engagement, in which one or more grooves or slots on one collar member are adapted to interlockingly and releasably receive and restrain one or more pins on the other collar member in order to interconnect the collar members and to longitudinally restrain the fluid conduits and the retaining assembly discussed above. In this arrangement, the grooves or slots can be configured to provide a feature by which complete disconnection of the fluid conduits is substantially prevented until any fluid pressure in the conduits is sufficiently relieved. After the pressure is relieved, the collar members can then be disengaged to allow complete disconnection of the fluid conduits.

In addition to the above, the various preferred embodiments of a fluid fitting or conduit assembly according to the present invention can include one or more sealing members on the inner and/or outer longitudinal sides of the retaining structure in order to substantially prevent fluid leakage from the joined conduits. Additionally, a lateral supporting ring is preferably disposed within the retaining structure to provide lateral support for the inserted fluid conduit within the socket, with the lateral support ring being either a separate member or integrally formed with the above-mentioned retaining ring. The lateral supporting ring can also serve as a retaining structure for the above-mentioned sealing member or members.

Additional objects, advantages and features of the present invention will become apparent from the following description and the appended claims, taken in conjunction with the accompanying drawings.

BRIEF DESCRIPTION OF THE DRAWINGS

FIG. 2 is a longitudinal cross-sectional view similar to FIG. 1, but showing the retaining structure partially disassembled and one of the fluid conduits being removed from its connection with the other fluid conduit.

FIG. 5 is a perspective view of one of the resilient spring or barb members of the quick-connect fitting assembly of FIG. 1, with the barb member being shown in its free, undeflected condition.

FIG. 6 is a longitudinal cross-sectional view of another preferred exemplary embodiment of a quick-connect fitting assembly according to the present invention, wherein the fitting assembly employs a "bayonet-type" connection and disconnection arrangement.

FIG. 7 is a partial top view of the assembly of FIG. 6, illustrating an exemplary interlocking pin-and-groove configuration for connecting and disconnecting the fluid conduits.

FIG. 8 is an end view, similar to that of FIG. 3, but illustrating another embodiment of a retaining ring for the quick-connect fitting assemblies of FIGS. 1 or 6.

FIG. 9 is a longitudinal cross-sectional view taken generally along line 9—9 of FIG. 8.

DETAILED DESCRIPTION OF THE PREFERRED EMBODIMENTS

Figure 1:
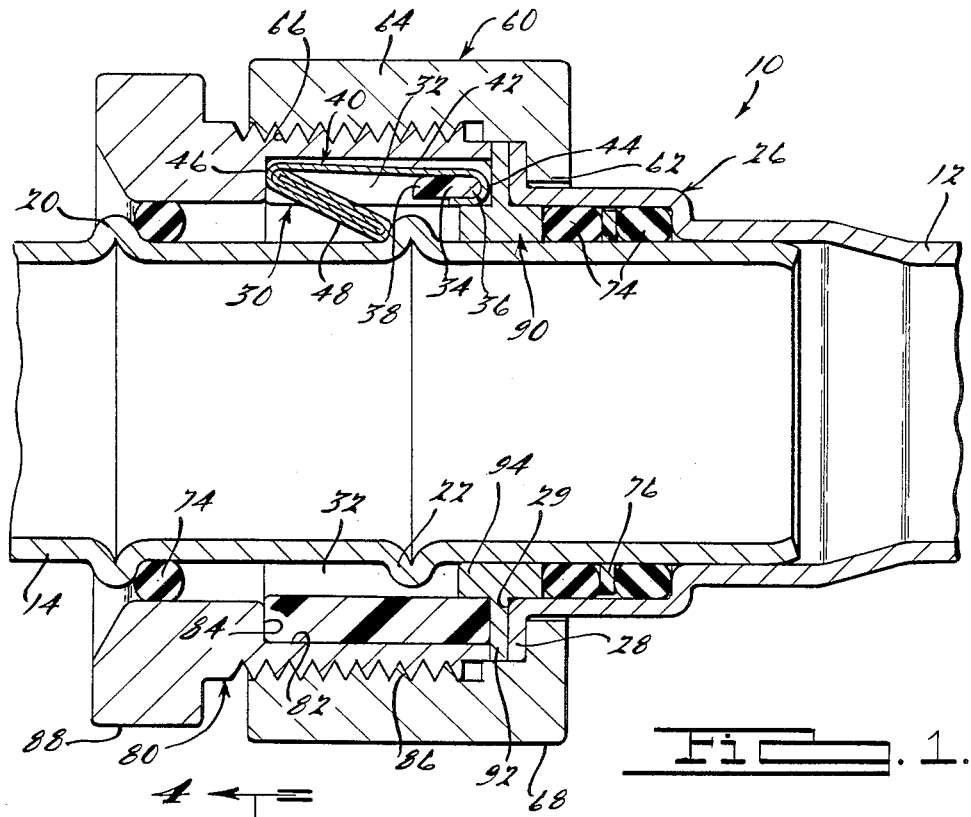
FIG. 1 is a longitudinal cross-sectional view of one preferred exemplary embodiment of a quick-connect fitting assembly according to the present invention.
Figure 3:
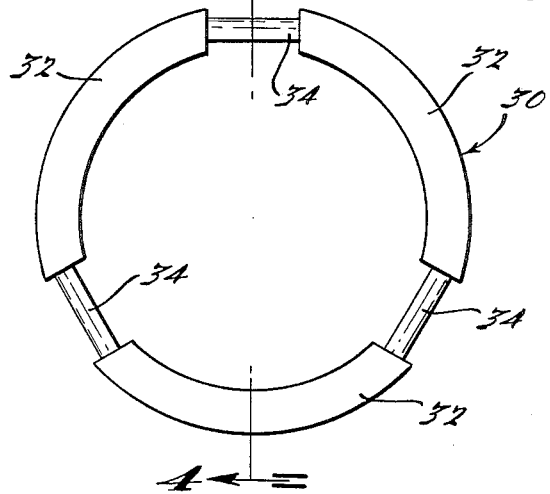
FIG. 3 is an end view of the retaining ring of the quick-connect fitting assembly of FIG. 1.
Figure 4:
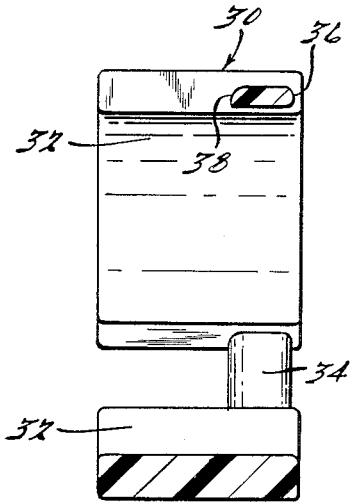
FIG. 4 is a longitudinal cross-sectional view taken generally along line 4—4 of FIG. 3.

FIGS. 1 through 9 illustrate various preferred exemplary embodiments of the present invention in a quick-connect fitting assembly for releasably connecting a pair of cylindrical fluid conduits to one another in fluid communication therebetween. As will become apparent to one skilled in the art from the following discussion, the principles of the present invention illustrated by the various exemplary embodiments depicted in the drawings are equally applicable to fluid systems, fluid conduits, and fluid fitting or coupling assemblies of shapes, configurations or types other than those shown for purposes of illustration in the drawings.

Referring primarily to FIGS. 1 to 2, one preferred quick-connect fitting assembly 10 in accordance with the present invention is provided for releasably connecting a first fluid conduit 12 and a second fluid conduit 14 to one another in fluid communication therebetween. The second fluid conduit 14 preferably includes first and second generally laterally-extending protuberances 20 and 22 and is longitudinally insertable in an inward direction into a socket member or assembly 26 that is either integrally formed on, or sealingly secured to, the first fluid conduit 12.

The socket member 26 preferably includes a laterally-extending, outwardly-protruding socket flange portion 28, which is disposed generally at its laterally-enlarged outer end 29. Such laterally-enlarged end 29 is adapted for easy insertion of the free end of the second fluid conduit 14, as well as various components of a retaining apparatus described below.

A retaining ring 30 is removably positionable generally adjacent the socket member 26 in a surrounding relationship with the second fluid conduit 14 when the second fluid conduit 14 is inserted into the socket member 26. As shown in FIGS. 1 through 4, the preferred retaining ring 30 includes a number of generally arcuate retaining ring sections or segments 32, which are longitudinally elongated and are interconnected, between laterally or circumferentially adjacent retaining ring sections, by a number of retaining ring pins 34.

The retaining apparatus also includes one or more spring or barb members 40 disposed generally adjacent the socket member 26 and longitudinally interconnected with the retaining ring 30. As shown in FIGS. 1, 2 and 5, the spring or barb members 40 each preferably include an anchoring portion 42, which has a generally hook-shaped inner end 44 and an opposite outer end 46. A barb portion 48 extends generally in a laterally inward and longitudinally inward direction from the outer end 46 of the anchoring portion 42 for longitudinally and laterally inwardly abutting the second protuberance 22 on the second fluid conduit 14 when the quick-connect fitting assembly 10 is assembled. During assembly of the various components of the retaining apparatus, the barb portions 48 of the resilient spring or barb members 40 are resiliently deflectable in a generally longitudinally inward and laterally outward direction in order to accommodate the longitudinally inward insertion of the second fluid conduit 14 (and thus the second protuberance 22) into the socket member 26. Once the spring or barb members 40 have been positioned generally adjacent the socket member 26, and the second fluid conduit 14 has been fully inserted, as shown in FIG. 1, the barb portions 48 abut the protuberances 22 on the second fluid conduit 14 to resist longitudinally outward withdrawal or movement of the second fluid conduit 14 from the socket member 26.

Preferably, the anchoring portions 42 of the barb members 40 are configured with an arcuate, laterally outwardly curving shape in their free, undeflected state as shown in FIG. 5. This preferred configuration enhances the restraining force of the barb portions 48 on the second protuberance 22 as a result of the arcuately shaped anchoring portions resiliently biasing the barb portions 48 laterally inwardly when the barb members 40 are installed within the socket member 26 in engagement with the retaining ring 30.

The generally hook-shaped ends 44 of the barb members 40 interlockingly are anchored and restrained by the longitudinally inner ends 36 of the retaining ring pins 34 on the retaining ring 30. In turn, the retaining apparatus assembly, which includes the retaining ring 30 and the spring or barb members 40, is restrained by a first retaining collar 60 longitudinally interconnected with the socket member 26 and a second retaining collar member 80 that is disposable in a generally surrounding relationship with the second fluid conduit 14. The second collar member 80 is longitudinally and removably interconnectable with the first retaining collar member 60, preferably by way of a threadable interconnection therebetween in the embodiment shown in FIGS. 1 and 2.

The first retaining collar member 60 includes a collar flange portion 62, a body portion 64, an internally threaded bore 66, and a preferably hex-shaped exterior 68. The first retaining collar 60 is disposed in a generally surrounding relationship with the first fluid conduit 12 and the socket member 26, with the collar flange portion 62 being adapted for longitudinally outward abutting engagement with the socket flange 28 on the socket member 26 in the embodiment of FIG. 1.

The second retaining collar member 80 includes an internal recessed or stepped portion 82, a shoulder portion 84, external threads 86, and preferably a generally hex-shaped end 88. By such a configuration, when the second retaining collar member 80 is longitudinally interconnected with the first retaining collar member 60, the retaining ring 30 and the anchoring portions 42 of the barb members 40 are received within the internal laterally recessed portion 82 of the second retaining collar member 80, with the shoulder portion 84 restraining at least the retaining ring sections 32 and preferably the ends 46 of the anchoring portions 42 on the barb members 40. Thus, as shown in FIG. 1, when the quick-connect fitting assembly 10 is fully assembled on the fluid conduits 12 and 14, the retaining ring 30 and the barb members 40 are longitudinally restrained by the first and second retaining collar 60 and 80, respectively, thereby securely connecting the fluid conduits 12 and 14 in fluid communication with one another.

In order to provide an adequate fluid seal between the fluid conduits 12 and 14, O-rings 74 can be provided on either or both inner and outer longitudinal sides of the retaining ring 30, thereby providing for fluid sealing between the second fluid conduit 14 and both the socket member 26 and the second retaining collar member 80 in order to substantially prevent leakage of fluid from the quick-connect assembly 10. Preferably, an O-ring spacer 76 is provided between the adjacent O-rings 74 within the socket member 26, and an O-ring retainer 90 is provided between the socket flange 28 and the retaining ring 30. Such O-ring retainer 90 not only longitudinally restrains the O-rings 74 within the socket member 26, but also preferably provides lateral support for the second fluid conduit 14 within the socket member 26. In this regard, the preferred O-ring retainer 90 includes a flange portion 92 extending laterally outwardly from a longitudinally enlarged body portion 94. The flange portion 92 is abuttingly restrained and anchored between the retaining ring 30 and the socket flange 28 with the longitudinally enlarged body portion 94 generally surrounding the second fluid conduit 14, thus providing a lateral support surface therebetween.

As mentioned above, the length, thread type, and thread helix shape for the various threaded components described above can optionally be chosen so that pressure relief of a charged fluid system begins to occur during a predetermined number of initial relative turns or rotations of the first and second collar members 60 and 80, with complete pressure relief occurring prior to complete disconnection of these components from one another. If such a feature is employed, the relative longitudinal lengths of the inserted portion of the second fluid conduit 14 and the socket portion 26 of the first fluid conduit 12 must of course be sized accordingly to provide for unsealing upon reaching such predetermined number of initial relative turns of the collar members 60 and 80. This optional feature can thus be provided to aid in the convenient disconnection of the fitting assembly in charged fluid conduit systems.

FIGS. 6 through 9 illustrate another of the preferred embodiments of the present invention, wherein a quick-connect fitting assembly 110 is similar in many respect to the quick-connect fitting assembly 10 described above and shown in FIGS. 1 through 5, with certain differences described in detail below. Because of the many similarities between the quick-connect fitting assemblies 10 and 110, however, various elements of the quick-connect fitting assembly 110 are indicated by reference numerals that are one-hundred numerals higher than those of the similar or corresponding elements of the quick-connect fitting assembly 10 shown in FIGS. 1 through 5.

In the quick-connect fitting assembly 110 shown in FIGS. 6 through 9, the threaded retaining collar members 60 and 80 of the quick-connect fitting assembly 10 shown in FIGS. 1 through 5 are replaced by first and second retaining collar members 160 and 180, which are releasably and interlockingly connectable to one another by way of a "bayonet-type", quick-connect arrangement. As perhaps best illustrated in FIGS. 6 and 7, the first retaining collar member 160 includes one or more generally serpentine grooves or slots 196 formed in its outer periphery. Similarly, the second retaining collar member 180 includes a corresponding number of pins or protuberances 198 fixedly attached, or integrally formed such as by staking, at its outer periphery. The pin or pins 198 on the second retaining collar member 180 are adapted to be received within the groove or grooves 196 on the first retaining collar member 160 in order to releasably and interlockingly interconnect the first and second retaining collar member 160 and 180 and thereby quickly and conveniently connect and disconnect the quick-connect fitting assembly 110.

Preferably, the groove or grooves 196 each include at least a pair of arcuate bights forming longitudinally recessed groove portions 202 and 204 at the intersections of the generally straight portions of the grooves 196, as shown in FIG. 7. The recessed groove portions 202 and 204 are preferably laterally or circumferentially offset relative to one another and are located at spaced-apart longitudinal locations on the first retaining collar member 160. An open groove portion 208 is disposed at the longitudinally outer end of the first retaining collar member 160 and is in communication with the recessed groove portions 202 and 204 preferably by way of an arcuate bight portion 206 in a laterally or circumferentially offset relationship with the remainder of the groove or slot 196.

In addition to the grooves or slots 196, the first retaining collar member 160 is also preferably provided with an interior stepped portion 192 disposed for abutting longitudinal engagement with a wavy spring washer 194, or other suitable resilient biasing means, disposed between the stepped portion 192 and the socket flange 128 on the socket portion 126 of the first fluid conduit 112. By such an arrangement, the quick-connect fitting assembly 110 can be releasably and interlockingly connected by longitudinally sliding or otherwise moving the first and second retaining collar members 160 and 180, respectively, relative to one another, with the pin or pins 198 laterally or circumferentially aligned with corresponding open portions 208 of the grooves or slots 196. Once such longitudinal relative movement has occurred to the extent that the pins 198 reach the corresponding bight portions 206, as indicated by reference numeral 198b in FIG. 7, the retaining collar members 160 and 180 may be circumferentially or laterally rotated with respect to one another in order to move the pins 198 into the longitudinally recessed groove portion 204, as indicated by reference numeral 198a in FIG. 7.

Because the recessed groove portion 204 is located at a longitudinal location on the first retaining collar member 160 that is longitudinally outward of the longitudinal location of the bight portion 206, and because the longitudinally inward movement of the second retaining collar member 180 relative to the first retaining collar member 160 has resiliently compressed the spring washer 194, the second retaining collar member 180 is resiliently biased into an interlocked relationship with the first retaining collar member 160 due to the pins 198 being resiliently urged in a longitudinally outward direction against the corresponding recessed groove portions 204, as indicated by reference numeral 198a in FIG. 7. Such resilient biasing force of the spring washer 194 is transmitted through the socket flange 128 to the second retaining collar member 180, as perhaps best shown in FIG. 6.

Continued longitudinally inward movement of the second retaining collar member 180 relative to the first retaining collar member 160 further compresses the spring washer 194 and allows the retaining collar members 160 and 180 to be further rotated laterally or circumferentially relative to one another in order to position the pins 198 in the corresponding recessed groove portions 202. Because the recessed groove portions 202 are longitudinally recessed in a longitudinally outward direction, and because the spring washer 194 has been further compressed between the stepped portion 192 and the socket flange 128, the quick-connect fitting assembly 110 is securely but releasably connected by way of the interlocking engagement of the first and second retaining collar members 160 and 180, respectively. This arrangement provides for the quick and convenient connection of the quick-connect fitting assembly 110 with the first and second fluid conduits 112 and 114 in a secure fluid communication with one another, in a manner similar to that described above in connection with FIGS. 1 through 5.

In order to substantially prevent fluid leakage from the quick-connect fitting assembly 110, an O-ring 174 is disposed within the socket portion 126 of the first fluid conduit 112, in order to provide a fluid sealed relationship between the first and second fluid conduits 112 and 114, respectively. Although no additional O-ring is provided adjacent the first protuberance 120 on the second fluid conduit 114 in FIG. 6, such as that shown adjacent the first protuberance 20 of the second fluid conduit 14 in FIG. 1, such additional sealing means may optionally be provided in the quick-connect fitting assembly 110 of FIG. 6 if deemed necessary or desirable in a particular application.

The quick-connect fitting assembly 110, with its "bayonet-type" connection arrangement, also provides for a pressure relief feature during disconnection, in a manner similar to that described above. When the quick-connect fitting assembly 110 is to be disconnected, the first and second retaining collar members 160 and 180 are laterally or circumferentially rotated with respect to one another in order to move the pins 198 from the corresponding recessed groove portions 202 to the position indicated by reference numeral 198a in FIG. 7, in an abutting engagement with the recessed groove portion 204, with the spring washer 194 biasing and urging the retaining collar members 160 and 180 apart from one another. When the pins 198 are in the position 198a shown in FIG. 7, the fluid conduits 112 and 114 are sufficiently partially disconnected in order to allow any internal fluid pressure within the fitting assembly to be relieved. However, because of the longitudinally outwardly recessed configuration of the recessed groove portions 204, along with the resilient biasing force of the spring washer 194, the retaining collar members 160 and 180 cannot be completely disconnected until further relative rotation to position the pins 198 at the position 198b shown in FIG. 7. At this point in the disassembly, the retaining collar members may be completely separated by passing the pins 198 through the open portions 208. Thus, as discussed above, the quick-connect fitting assembly 110 provides a feature by which complete disconnection of the fluid conduits is substantially prevented until any fluid pressure in the conduits is sufficiently relieved, after which the retaining collar members can then be disengaged in order to allow complete disconnection of the quick-connect fitting assembly 110 and the fluid conduits 112 and 114.

It should be noted that although the groove or grooves 196 are shown in FIGS. 6 and 7 as being open to the outer peripheral surface of the first retaining collar member 160, one skilled in the art will now readily recognize from the foregoing discussion that such grooves can optionally be formed only in the interior of the first retaining collar member 160 to a depth less than the radial thickness of the wall of the collar member 160 such that the grooves are closed to the outer peripheral surface of the collar member 160.

In addition to the above, the quick-connect fitting assembly 110 is also provided with a retaining ring 130 that differs from the retaining ring 30 shown in FIGS. 1 through 5 in that it includes a radially inwardly stepped portion 190 in lieu of the separate O-ring retainer 90 shown in the quick-connect fitting assembly 10 of FIGS. 1 and 2. The provision of the stepped portion 190 of the retaining ring 130 somewhat simplifies the assembly of the quick-connect fitting assembly 110, while still providing the O-ring retention feature and the lateral support function of the separate O-ring retainer 90 in the quick-connect fitting assembly 10.

In this regard, it should be noted that the above-discussed "bayonet-type" retaining collar members 160 and 180 can also optionally be substituted for the threaded retaining collar members 60 and 80 in the quick-connect fitting assembly 10 shown in FIGS. 1 through 5. Similarly, the retaining ring 130 with its fixedly connected or integrally formed stepped portion 190, can be substituted for the retaining ring 30 and the O-ring container 90 in the quick-connect fitting assembly 10.

The foregoing discussion discloses and describes exemplary embodiments of the present invention. One skilled in the art will readily recognize from such discussion, and from the accompanying drawings, that various changes, modifications, and variations may be made therein without departing from the spirit and scope of invention as defined in the following claims.

We claim:

1. A quick-connect fitting assembly for releasably connecting a pair of fluid conduits to one another for fluid communication therebetween, said quick-connect fitting assembly comprising:

socket means on a first of the fluid conduits for receiving a second of the fluid conduits inserted longitudinally inwardly into said socket means, said second fluid conduit having a laterally outwardly-extending protuberance thereon; and retainer means for releasably retaining said second fluid conduit within said socket means, said retainer means including a retaining ring removably disposable generally adjacent said socket means and adapted for generally surrounded said second conduit, a number of barb members longitudinally interconnectable with said retaining ring, said retaining ring including a number of retainable ring sections interconnected by a number of retaining ring pin portions, said barb members being interconnectable in a longitudinal engagement with said retaining ring pins, said barb members being resiliently and laterally deflectable into a longitudinally interlocking engagement with said protuberance as said second fluid conduit is inserted into said socket means, and retaining collar means longitudinally and releasably interconnectable with said socket means in a longitudinally restraining relationship with at least said retaining ring for longitudinally restraining said retaining ring, said barb members and said second fluid conduit relative to said socket means on said first fluid conduit.

2. A quick-connect fitting assembly according to claim 1, further comprising a lateral support ring disposable at least partially within said socket means for laterally supporting said second conduit within said socket member, said lateral supporting ring being longitudinally restrained relative to within said socket means by said retaining ring.

3. A quick-connect fitting assembly according to claim 2, wherein said lateral support ring is fixed to said retaining ring.

4. A quick-connect fitting assembly according to claim 1, wherein said retaining collar means includes a first retaining collar member longitudinally interconnected with said socket means, and a second retaining collar member disposable in a generally surrounding relationship with said second fluid conduit and longitudinally and removably interconnectable with said first retaining collar member, said second retaining collar member longitudinally restraining at least said retaining ring when said second retaining collar member is longitudinally interconnected with said first retaining collar member.

5. A quick-connect fitting assembly according to claim 4, wherein said socket means includes a laterally outwardly-protruding socket flange portion, said first retaining collar member having a laterally inwardly-protruding collar flange portion disposed for longitudinal interference with said socket flange portion, and said second retaining collar member having a laterally-outwardly recessed portion therein for receiving and longitudinally restraining at least said retaining ring.

6. A quick-connect fitting assembly according to claim 5, wherein said first and second retaining collar members are threadably interconnectable with one another.

7. A quick-connect fitting assembly according to claim 5, wherein said first and second retaining collar members are releasably and interlockingly interconnectable with one another, one of said collar members having a groove formed therein, and the other of said collar members having a pin thereon, said pin being releasably and interlockingly receivable in said groove.

8. A quick-connect fitting assembly according to claim 1, wherein said retaining collar means is interconnectable with said socket means in a longitudinally inward restraining relationship with both said retaining ring and said barb members, said barb members having anchoring portions for engaging said retaining ring in a longitudinally outward direction.

9. A quick-connect fitting assembly according to claim 1, wherein said barb members include anchoring portions having generally hook-shaped ends for engaging said retaining ring pins in a laterally outward direction, said retaining collar means being interconnectable with said socket means in a longitudinally inward restraining relationship with both said retaining ring sections and said anchoring portions of said barb members.

10. A quick-connect fitting assembly according to claim 9, wherein said barb members include barb portions extending generally in a laterally inward and longitudinally inward direction from said anchoring portions for longitudinally inward abutment with said lateral protuberance on said second conduit, said barb portions being resiliently deflectable in a generally laterally outward direction in order to accommodate longitudinally inward insertion of said second fluid conduit into said socket means during assembly of said quick-connect fitting but to resist longitudinally outward withdrawal of said second fluid conduit from said socket means.

11. A quick-connect fitting assembly for releasably connecting a pair of fluid conduits to one another for fluid communication therebetween, said quick-connect fitting assembly comprising:

socket means on a first of the fluid conduits for receiving a second of the fluid conduits inserted longitudinally inwardly into said socket means, said second fluid conduit having a laterally outwardly-extending protuberance thereon; and a retaining ring removably disposable generally adjacent said socket means and generally surrounding said second fluid conduit, said retaining ring including a number of retaining ring sections interconnected by a number of ring pin portions;

a number of barb members interconnectable with and longitudinally outwardly engaging said retaining ring pins, said barb members having barb portions extending in a generally longitudinally inward and laterally outward direction to engage said protuberance on said second fluid conduit in a longitudinally inward abutment therewith, said barb portions being resiliently deflectable in a generally laterally outward direction to accommodate said longitudinally inward insertion of said second fluid conduit into said socket means during assembly of said quick-connect fitting;

a first retaining collar member longitudinally interconnected with said socket means; and a second retaining collar means disposable in a generally surrounding relationship with said second fluid conduit and being longitudinally and removably interconnectable with said first retaining collar member, said second retaining collar member having a laterally-outwardly recessed portion therein for receiving and longitudinally restraining at least said retaining ring.

12. A quick-connect fitting assembly according to claim 11, wherein said barb members include anchoring portions interconnected with said retaining ring, both said retaining ring and said anchoring portions of said barb members being received within said recessed portion of said second retaining collar member and longitudinally inwardly restrained thereby.

13. A quick-connect fitting assembly according to claim 12, wherein said anchoring portions of said barb members have generally hook-shaped ends for engaging said retaining ring in a generally longitudinal outward direction.

14. A quick-connect fitting assembly according to claim 11, wherein said barb members include anchoring portions have generally hook-shaped longitudinally inward ends for engaging said retaining ring pins in a generally longitudinally outward direction, said anchoring portions having longitudinally outward ends opposite said longitudinally inward ends, said second retaining collar member longitudinally inwardly restraining both said retaining ring and said longitudinally outward ends of said anchoring portions of said barb members.

15. A quick-connect fitting assembly according to claim 14, wherein said socket means includes a laterally outwardly-protruding socket flange portion, said first retaining collar member having a laterally inwardly-protruding collar flange portion disposed for longitudinal interference with said socket flange portion.

16. A quick-connect fitting assembly according to claim 11, further comprising a lateral support ring insertable at least partially within said socket means for laterally supporting said second fluid conduit within said socket member, said lateral supporting ring being longitudinally restrained relative to said socket means by said retaining ring.

17. A quick-connect fitting assembly according to claim 16, wherein said lateral support ring is fixed to said retaining ring.

18. A quick-connect fitting assembly for releasably connecting a pair of fluid conduits to one another for fluid communication therebetween, said quick-connect fitting assembly comprising:

socket means on a first of the fluid conduits for receiving a second of the fluid conduits inserted longitudinally inwardly into said socket means, said socket means having a laterally outwardly-protruding socket flange portion thereon, said second conduit having a laterally outwardly-extending protuberance thereon;

a retaining ring removably positionable generally adjacent said socket means and generally surrounding said second fluid conduit, said retaining ring including a number of retaining ring sections interconnected by a number of retaining ring pin portions between adjacent retaining ring sections, said retaining ring sections being longitudinally elongated;

a number of barb members removably positionable within said socket means, said barb members having anchoring portions with generally hook-shaped ends longitudinally outwardly engageable with said retaining ring pins, said barb members further having barb portions extending from said anchoring portions in a generally longitudinally inward and laterally inward direction to engage said protuberance on said second fluid conduit in a longitudinally inward abutment therewith, said barb portions being resiliently deflectable in a generally laterally outward direction to accommodate said longitudinally inward insertion of said second fluid conduit into said socket means during assembly of said quick-connect fitting;

a first retaining collar member generally surrounding said socket means and having a laterally inwardly-protruding collar flange portion thereon adapted for longitudinally-outward interference with said socket flange portion;

a second retaining collar member positionable in a generally surrounding relationship with said second fluid conduit and being longitudinally and removably interconnectable with said first retaining collar member, said second retaining collar member having a laterally-outwardly recessed portion therein for receiving and longitudinally inwardly restraining said retaining ring and said anchoring portions of said barb members.

19. A quick-connect fitting assembly according to claim 18, further comprising a lateral support ring insertable at least partially within said socket means for laterally supporting said second fluid conduit within said socket member, said lateral supporting ring being longitudinally restrained relative to said socket means by said retaining ring.

20. A quick-connect fitting assembly according to claim 19, wherein said lateral support ring is fixed to said retaining ring.

21. A quick-connect fitting assembly according to claim 19, wherein said first and second retaining collar members are threadably interconnectable with one another.

22. A quick-connect fitting assembly according to claim 18, wherein said first and second retaining collar members are releasably and interlockingly interconnectable with one another, one of said collar members having a groove formed therein, and the other of said collar members having a pin thereon, said pin being releasably and interlockingly receivable in said groove.

23. A quick-connect fitting assembly according to claim 21, further comprising sealing means on both inner and outer longitudinal sides of said retaining ring for substantially preventing fluid leakage from said quick-connect fitting assembly.

24. A quick-connect fitting assembly according to claim 21, further including sealing means at least between said second fluid conduit and said socket means for substantially preventing fluid leakage from said quick-connect fitting assembly.

25. A quick-connect fitting assembly for releasably connecting a pair of fluid conduits to one another for fluid communication therebetween, said quick-connect fitting assembly comprising:

socket means on a first of the fluid conduits for receiving a second of the fluid conduits inserted longitudinally inwardly into said socket means, said second fluid conduit having a laterally outwardly-extending protuberance thereon;

retainer means for releasably retaining said second fluid conduit within said socket means, said retainer means including a retaining ring removably disposable within said socket means and adapted for generally surrounding said second conduit, a number of barb members disposable within said socket means and longitudinally interconnectable with said retaining ring, said retaining ring including a number of retaining ring sections interconnected by a number of retaining ring pin portions, said barb members being interconnectable in a longitudinal engagement with said retaining ring pins, said barb members being resiliently and laterally deflectable into a longitudinally interlocking engagement with said protuberance as said second fluid conduit is inserted into said socket means, and retaining collar means longitudinally and releasably interconnectable with said socket means in a longitudinally restraining relationship with at least said retaining ring for longitudinally restraining said retaining ring, said barb members and said second fluid conduit within said socket means;

said retaining collar means including a first retaining collar member longitudinally interconnected with said socket means, and a second retaining collar member disposable in a generally surrounding relationship with said second fluid conduit, one of said retaining collar members having a groove formed therein, and the other of said collar members having a pin thereon, said pin being releasably and interlockingly receivable in said groove.

26. A quick-connect fitting assembly according to claim 25, wherein said groove is formed in said first retaining collar member, and said pin is on said second retaining collar member.

27. A quick-connect fitting assembly according to claim 25, further including resilient biasing means disposed between said first retaining collar member and said socket means for resiliently biasing said first retaining collar member in a longitudinally inward direction relative to said socket means.

28. A quick-connect fitting assembly according to claim 25, wherein said groove includes at least a pair of longitudinally recessed groove portions at longitudinally spaced and laterally offset locations on said one retaining collar member, said pin being receivable in each of said recessed groove portions in order to longitudinally restrain said other retaining collar member at a pair of predetermined longitudinal positions relative to said one retaining collar member, said positions corresponding to the longitudinally spaced locations of said pair of recessed groove portions.

29. A quick-connect fitting assembly according to claim 28, wherein said retaining collar members longitudinally restrain said second fluid conduit in a substantially fluid sealed engagement within said socket means on said first fluid conduit when said pin is in a first longitudinally inner one of said recessed groove portions, said retaining collar members longitudinally restraining said fluid conduits in an unsealed relationship when said pin is in a second longitudinally outer of said recessed groove portions.

30. A quick-connect fitting assembly according to claim 29, wherein said groove includes an open groove portion at the longitudinally outer end of said one retaining collar member, said open groove portion being at a laterally offset location relative to said recessed groove portions and in communication therewith, said retaining collar members being completely longitudinally separable when said pin is moved to said open groove portion in order to disconnect said fluid conduits from one another.

31. A quick-connect fitting assembly according to claim 30, further including resilient biasing means disposed between said first retaining collar member and said socket means for resiliently biasing said socket means, said retaining ring and said second retaining collar member in a longitudinally outward direction relative to said first retaining collar member.

32. A quick-connect fitting assembly according to claim 25, further comprising means for selectively relieving any internal fluid pressure in said fitting assembly prior to complete disconnection of said fluid conduits and for substantially preventing complete disconnection of said fluid conduits until said internal fluid pressure is relieved to a predetermined level.

33. A quick-connect fitting assembly according to claim 25, further including sealing means at least between said second fluid conduit and said socket means for substantially preventing fluid leakage from said quick-connect fitting assembly, and a sealing means retainer for retaining said sealing means within said socket means when said fitting means is assembled.

34. A quick-connect fitting assembly according to claim 33, wherein said sealing means retainer is fixed to said retaining ring.

* * * * *

UNITED STATES PATENT AND TRADEMARK OFFICE
CERTIFICATE OF CORRECTION

PATENT NO. : 4,842,309

DATED : June 27, 1989

INVENTOR(S) : Leon F. LaVene et al.

It is certified that error appears in the above-identified patent and that said Letters Patent is hereby corrected as shown below:

Title Page,
Abstract, Line 10, "of" should be --or--;

Col. 2, Line 5, "general" should be --present--;

Col. 2, Line 47, "charge" should be --charged--;

Col. 2, Line 51, "brings" should be --begins--;

Col. 4, Line 3, "to" should be --and-- (2nd occurrence);

Col. 6, Line 18, "respect" should be --respects--;

UNITED STATES PATENT AND TRADEMARK OFFICE
CERTIFICATE OF CORRECTION

PATENT NO. : 4,842,309
DATED : June 27, 1989
INVENTOR(S) : Leon F. LaVene et al.

It is certified that error appears in the above-identified patent and that said Letters Patent is hereby corrected as shown below:

Col. 9, Line 24, Claim 1, "surrounded" should be --surrounding--;

Col. 11, Line 27, Claim 14, "have" should be --having--.

Signed and Sealed this

Eleventh Day of December, 1990

*Attest:*

HARRY F. MANBECK, JR.

*Attesting Officer*      *Commissioner of Patents and Trademarks*